United States Patent [19]

Anisfield

[11] Patent Number: 5,193,903
[45] Date of Patent: Mar. 16, 1993

[54] LAMP SAFETY RETAINER WITH SHEATHED SPRING RETAINERS

[75] Inventor: Richard C. Anisfield, Saddle River, N.J.

[73] Assignee: Kurt Versen Company, Westwood, N.J.

[21] Appl. No.: 943,717

[22] Filed: Sep. 11, 1992

[51] Int. Cl.5 ............................................. F21V 21/00
[52] U.S. Cl. ..................................... 362/376; 362/260; 362/378
[58] Field of Search .............. 362/260, 147, 216, 226, 362/376, 377, 378, 404, 440

[56] References Cited

U.S. PATENT DOCUMENTS

| | | | |
|---|---|---|---|
| 1,151,219 | 8/1915 | Scherer | 362/378 X |
| 2,003,507 | 6/1935 | Guljas, Jr. | 173/350 |
| 2,421,507 | 5/1947 | Dunkelberger | 362/376 X |
| 2,476,641 | 7/1949 | Leighton | 29/747 |
| 3,694,649 | 9/1972 | Thompson | 362/390 |
| 3,723,945 | 3/1973 | Detch | 339/54 |
| 4,387,417 | 6/1983 | Plemmons et al. | 362/376 |
| 4,500,946 | 2/1985 | Mikola | 362/226 |
| 4,703,406 | 10/1987 | Elliott et al. | 362/365 |
| 4,704,668 | 11/1987 | Kosek | 362/390 |
| 4,811,183 | 3/1989 | Guritz et al. | 362/377 |
| 4,819,133 | 4/1989 | Kochi et al. | 362/61 |
| 4,878,159 | 10/1989 | Blaisdell et al. | 362/222 |
| 4,970,632 | 11/1990 | Tseng | 362/226 |
| 5,075,832 | 12/1991 | Pace | 362/376 |

Primary Examiner—Stephen F. Husar
Attorney, Agent, or Firm—Samuelson & Jacob

[57] ABSTRACT

A lamp safety retainer includes resiliently flexible retainer elements in the form of helically coiled spring wire retainers covered with a non-metallic textile material and located beneath the base of a vertically oriented compact fluorescent lamp coupled with a lamp socket in a luminaire so as to intercept the base upon inadvertent uncoupling of the lamp from the lamp socket to preclude fall of the uncoupled lamp from the luminaire, while enabling selective flexing of the retainer elements for deliberate removal and replacement of the lamp in the luminaire.

16 Claims, 3 Drawing Sheets

LAMP SAFETY RETAINER WITH SHEATHED SPRING RETAINERS present invention relates generally to luminaires and pertains, more specifically, to a safety retainer for preventing the fall of a lamp from a luminaire upon inadvertent uncoupling of the lamp from a complementary socket in the luminaire.

The current emphasis upon energy conservation has led to the development of more energy efficient luminaires. The compact fluorescent lamp has become a lamp of choice for energy efficiency, and a variety of luminaires have been constructed utilizing the compact fluorescent lamp as a light source. Among these luminaires are downlights in which the compact fluorescent lamp is mounted in a vertical position with the lamp envelope extending downwardly from the lamp base. In such an arrangement, the lamp base is coupled with a complementary lamp socket and is held in place within the socket by means of complementary detents in the lamp socket and the lamp base. While the detent coupling arrangement generally is adequate to maintain the lamp base coupled with the lamp socket in the variety of lamp orientations encountered in different installations, experience has shown that in downlights in which the compact fluorescent lamp is oriented vertically, with the lamp envelope projecting downwardly from the lamp base, inadvertent uncoupling of the lamp from the socket can occur, resulting in the lamp falling from the luminaire. Such an occurrence, at the very least, can result in destruction of the lamp and, at worst, can cause damage to equipment and injury to persons beneath the luminaire, in the path of a falling lamp.

The present invention provides a safety retainer arrangement for preventing the fall of an inadvertently uncoupled compact fluorescent lamp from a luminaire and, as such, exhibits several objects and advantages, some of which are summarized as follows: Provides a simple arrangement easily incorporated into current luminaire constructions for effectively precluding the fall of a compact fluorescent lamp from the luminaire upon inadvertent uncoupling of the lamp from the lamp socket of the luminaire; catches a dropped inadvertently uncoupled lamp so as to prevent destruction of the lamp, as well as damage to adjacent equipment and injury to persons beneath the luminaire, in the path of the falling uncoupled lamp, without impeding selective removal and replacement of the lamp; is readily employed in connection with a wide variety of luminaire constructions without requiring extensive modification of existing luminaire designs; introduces no adverse effects in the lighting performance of the luminaire into which the arrangement is incorporated; is relatively inexpensive and easily adapted to current luminaire constructions for immediate and widespread use.

The above objects and advantages, as well as further objects and advantages, are attained by the present invention which may be described briefly as a safety retainer for a luminaire of the type including a lamp socket and a compact fluorescent lamp having a lamp base normally received within the lamp socket and a lamp envelope extending longitudinally downwardly from a near end at the lamp base to a far end away from the lamp base, the lamp base having a outer periphery including at least portions extending laterally outwardly beyond the lamp envelope adjacent the near end of the lamp envelope, the safety retainer comprising: resiliently flexible retainer elements affixed to the luminaire and having spring wire retainer portions at retainer locations placed laterally inwardly beneath the lamp socket to establish an aperture through which the lamp envelope projects when the lamp is in the luminaire, at least portions of the aperture at the retainer locations being laterally smaller than corresponding portions of the outer periphery of the lamp base and placed beneath the corresponding portions of the outer periphery of the lamp base when the lamp is received within the lamp socket for interception of the lamp base by the retainer elements should the lamp base fall from the lamp socket; the resilient flexibility of the spring wire retainer elements being such that the lamp will be supported by the retainer elements against falling downwardly through the safety retainer, and will enable deliberate resilient dilation of the aperture at the retainer locations to permit selective movement of the lamp base through the safety retainer for removal and replacement of the lamp in the luminaire.

The invention will be understood more fully, while still further objects and advantages will become apparent, in the following detailed description of preferred embodiments of the invention illustrated in the accompanying drawing, in which.

Figure 1:
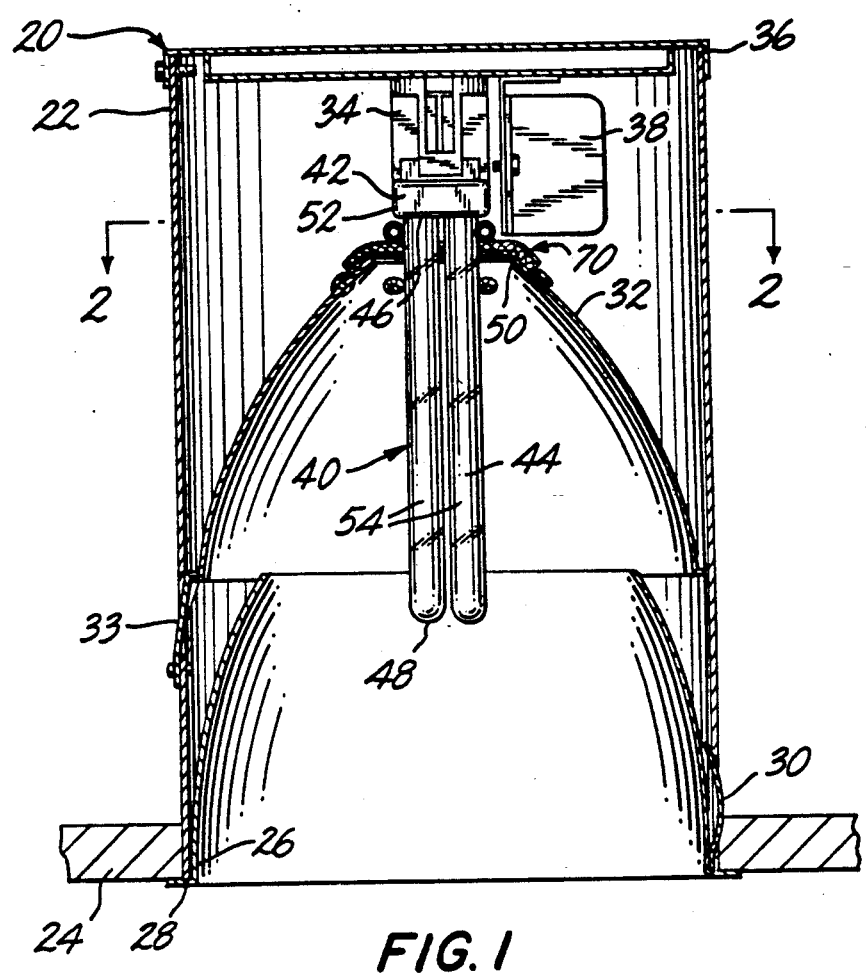
FIG. 1 is an elevational, longitudinal cross-sectional view of an installed luminaire employing a lamp safety retainer constructed in accordance with the invention.
Figure 2:
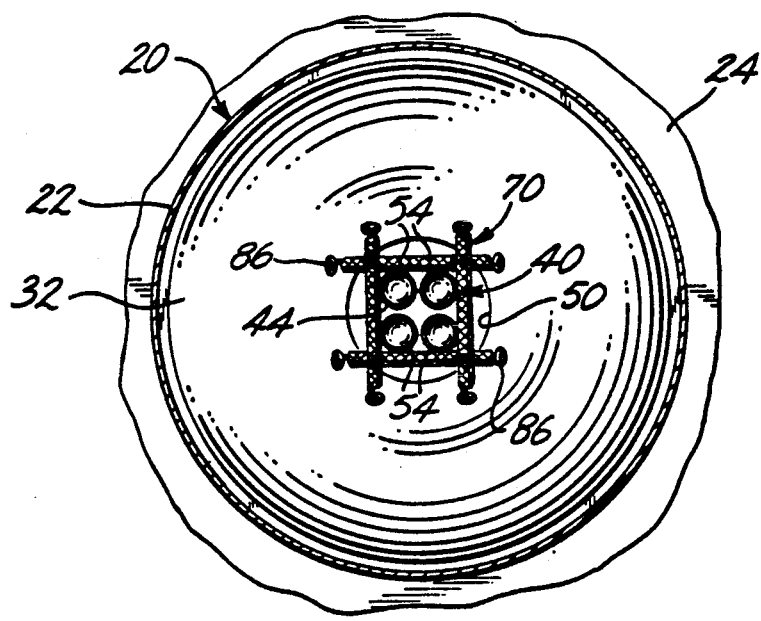
FIG. 2 is a cross-sectional view taken along line 2—2 of FIG. 1.

Referring now to the drawing, and especially to FIGS. 1 and 2 thereof, a luminaire in the form of a downlight is illustrated generally at 20 and is seen to include a generally tubular housing 22 placed within a ceiling 24. A specular cone 26 is located adjacent the lowermost end 28 of the housing 22 and is secured in place by means of spring clips, one of which spring clips is shown at 30. A reflector 3 is placed immediately above the specular cone 26 and is affixed within housing 22 by clips, one of which clips is illustrated at 33. A lamp socket 34 is mounted in the housing 22 adjacent the uppermost end 36 of the housing 22 and a ballast 38 is secured in the housing 22 near the lamp socket 34 and is connected electrically with the lamp socket 34.

A compact fluorescent lamp 40 provides the light source for downlight 20 and includes a lamp base 42 and a lamp envelope 44. Compact fluorescent lamp 40 is oriented in a vertical direction with lamp base 42 received within and coupled with the lamp socket 34 and lamp envelope 44 extending longitudinally downwardly from a near end 46 at the lamp base 42 to a far end 48 away from the lamp base 42 so as to project through an opening 50 in the reflector 32 for appropriate location of the light source relative to the reflector 32. The lamp base 42 has an outer periphery 52, at least portions of which outer periphery 52 extend laterally outwardly beyond the lamp envelope 44, adjacent the near end 46 of the lamp envelope 44, but not laterally outwardly beyond the perimeter of opening 50. Thus, lamp 40 is able to be moved in vertical directions through opening 50, as when lamp 40 is removed from downlight 20 and replaced. The lamp envelope 44 is seen to have four tubular branches 54; however, other lamp envelope configurations are available.

Figure 3:
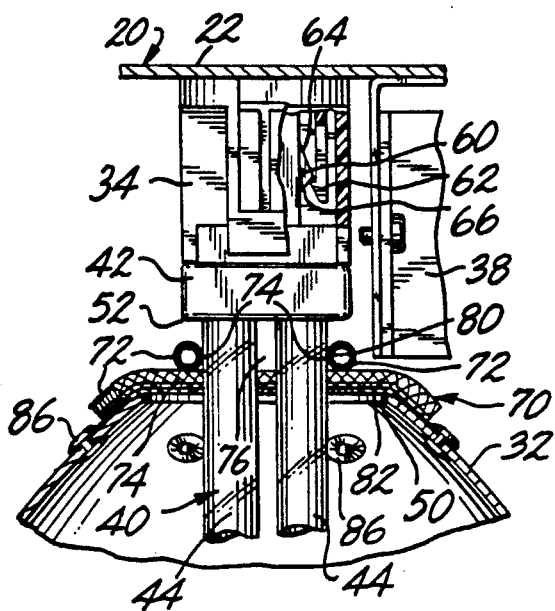
FIG. 3 is an enlarged fragmentary view of a portion of FIG. 1, partially cut away to illustrate internal details.

Turning now to FIG. 3, lamp base 42 is coupled with lamp socket 34 by reception within lamp socket 34 and is secured within lamp socket 34 by means of a detent arrangement which includes first detent elements in the form of lateral protuberances 60 (also see FIG. 5) unitary with the lamp base 42 and second detent elements in the form of latches 62 (only one of which is illustrated in FIG. 3) unitary with the lamp socket 34 and complementary with corresponding protuberances 60. When lamp base 42 is seated properly within lamp socket 34, an appropriate electrical connection is established between the ballast 38 and the lamp 40 and each latch 62 engages a corresponding protuberance 60 to maintain the lamp 40 coupled with the lamp socket 34 for operation of the downlight 20.

In order to facilitate insertion and removal of lamp 40, as for installation and replacement of the lamp 40 in downlight 20, the protuberances 60 each include a tapered profile configuration which provides an in-ramp 64 and an out-ramp 66. The in-ramp 64 facilitates displacement of each latch 62 to pass over a corresponding protuberance 60 upon insertion of a lamp base 42 into the lamp socket 34. The out-ramp 66 enables displacement of each latch 62 to pass over a corresponding protuberance 60 upon pulling the lamp 40 to remove the lamp base 42 from the lamp socket 34 for selective replacement of the lamp 40. However, experience has demonstrated that the same construction which facilitates selective removal of the lamp 40 from the lamp socket 34 also allows occasional inadvertent uncoupling of the lamp base 42 from the lamp socket 34, resulting in the lamp 40 dropping freely and falling out of the downlight 20. Upon such an occurrence, the lamp 40 usually will be destroyed, and can cause damage to equipment and even injury to persons located beneath the downlight 20, in the path of the falling lamp 40.

Figure 4:
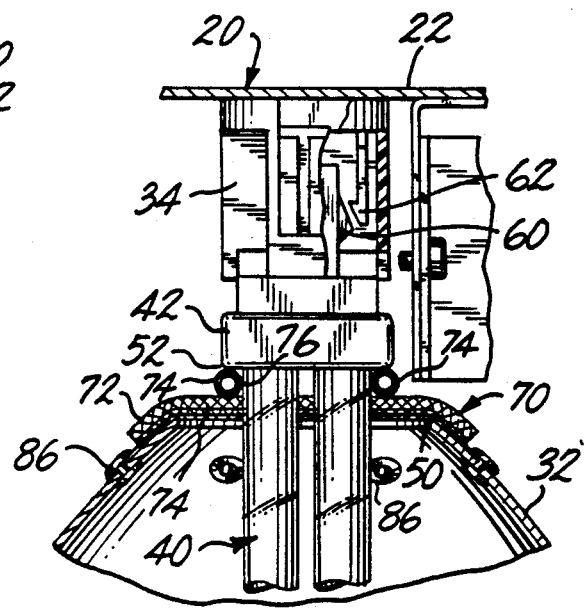
FIG. 4 is a view similar to FIG. 3, but with the illustrated components in another position.
Figure 5:
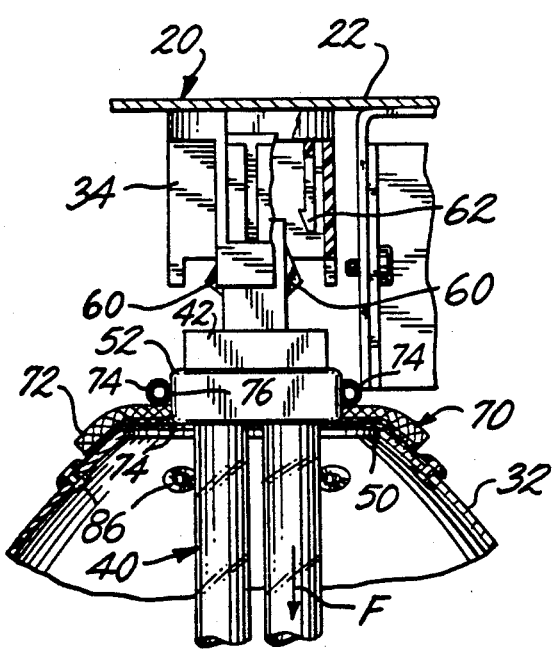
FIG. 5 is a view similar to FIG. 3, but with the illustrated components in still another position.

The present invention prevents the destruction, damage and injury previously experienced upon inadvertent uncoupling of the lamp 40 from the lamp socket 34. Thus, referring now to FIGS. 4 through 6, as well as to FIGS. I through 3, a safety retainer 70 includes resiliently flexible retainer elements in the form of helically coiled spring wire retainers 72 providing resiliently flexible spring wire retainer portions in the form of helically coiled springs 74 at retainer locations placed laterally inwardly beneath the lamp socket 34 and establishing an aperture 76 through which the lamp envelope 44 projects when the lamp 40 is coupled properly with the lamp socket 34 for operation in the downlight 20. Springs 74 confront aperture 76 and extend along chordal directions across chordal portions of opening 50. At least portions of the aperture 76 are laterally smaller than corresponding portions of the outer periphery 52 of the lamp base 42 so that should the lamp base 42 become uncoupled inadvertently from the lamp socket 34 and the lamp 40 drop, the lamp base 42 will be intercepted by the springs 74 of the spring wire retainers 72, as illustrated in FIG. 4. The resilient flexibility provided by the helically coiled springs 74 which comprise the spring wire retainer portions is such that the lamp 40 is then supported by the spring wire retainers 72 against falling downwardly through the safety retainer 70 and the lamp 40 will not fall from the downlight 20. However, when it is desired to remove the lamp 40 from the downlight 20, as for periodic replacement of the lamp 40, deliberate movement of the lamp base 42 through the aperture 76 is permitted by the flexible nature of the springs 74. Thus, pulling downwardly upon the lamp 40, by application of a downward force F upon the lamp 40, as illustrated in FIG. 5, will flex the spring wire retainers 72 radially outwardly to resiliently dilate aperture 76 and permit passage of the lamp base 42 downwardly through the aperture 76 in the safety retainer 7 for deliberate removal of the lamp 40 from the downlight 20. Conversely, passage of the lamp base 42 upwardly through the aperture 76 is permitted by resilient dilation of aperture 76 for insertion of a lamp 40 into the downlight 20.

Figure 6:
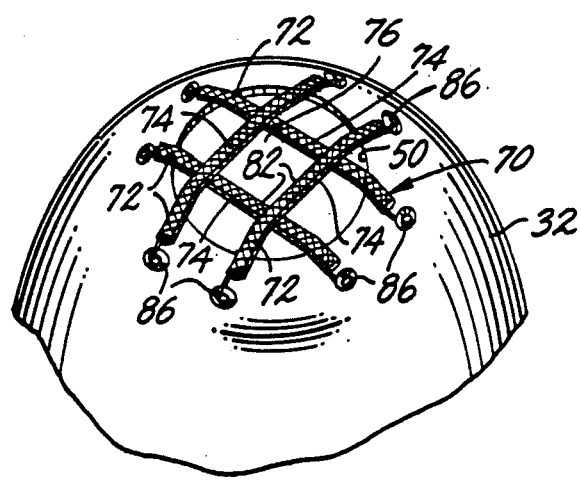
FIG. 6 is a fragmentary perspective view of a component part of the luminaire of FIG. 1 with the lamp safety retainer affixed thereto.

As best seen in FIG. 6, safety retainer 70 preferably is constructed of four helically coiled spring wire retainers 72 affixed to reflector 32 so that aperture 76 is juxtaposed with the opening 50 in the reflector 32. In the preferred embodiment, aperture 76 is just large enough to permit the projection of the lamp envelope 44 through the aperture 76 and is generally complementary to the corresponding portion 80 (se FIG. 3) of lamp envelope 44 at the aperture 76 so that the spring wire retainers 72 extend inwardly of opening 50 to assure interception of the lamp base 42 by the spring wire retainers 72 as described above. Since such inward extension of the spring wire retainers 72 ordinarily will result in at least some contact between at least some of the springs 74 and the lamp envelope 44, at least the springs 74 are covered with a non-metallic material. Thus, a cover in the form of a tubular sheath 82, preferably constructed of a sleeve of heat-resistant textile material, is placed over the springs 74 of the spring wire retainers 72. The preferred textile material is a fiberglass textile material. The resilient characteristics of the spring wire retainers 72, and especially the helically coiled springs 74 thereof, provide sufficient stiffness to catch and support an uncoupled, dropped lamp 40, while providing the flexibility needed for selective removal and replacement of lamp 40. Each of the four spring wire retainers 72 is affixed to the reflector 32 by means of fasteners, shown in the form of rivets 86, and the four spring wire retainers 72 are arranged around the generally square aperture 76 in a rectangular pattern of overlapping spring wire retainers 72 so as to provide sufficient support for an inadvertently uncoupled lamp 40, while enabling deliberate flexing to dilate aperture 76 for facilitating removal and replacement of the lamp 40.

Figure 7:
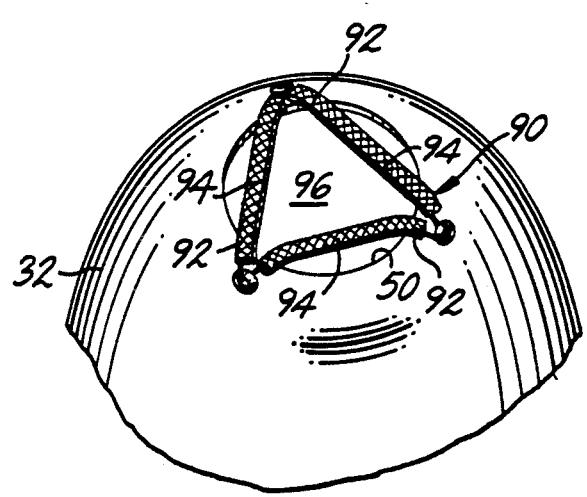
FIGS. 7 and 8 are views similar to FIG. 6, but illustrating alternate embodiments of the lamp safety retainer.

In an alternate embodiment illustrated in FIG. 7, safety retainer 90 includes resiliently flexible retainer elements in the form of three helically coiled spring wire retainers 92 including spring wire retainer portions in the form of helically coiled springs 94 extending in chordal directions across the opening 50 in a triangular pattern to establish a triangular aperture 96. Each of the spring wire retainers 92 is affixed to the reflector 32 so as to place the springs 94 and aperture 96 in appropriate juxtaposition with the opening 50 in the reflector 32. The relationship between the configuration and dimensions of the aperture 96 and the lamp base 42 is such that the triangular pattern of springs 94 enables safety retainer 90 to operate in a manner similar to that described in connection with safety retainer 70.

Figure 8:
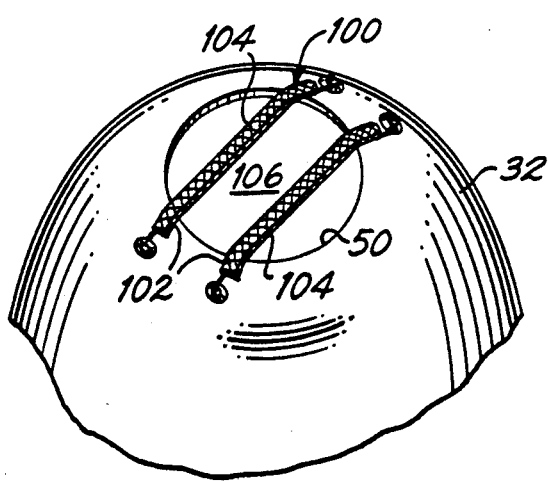

In the embodiment of FIG. 8, safety retainer 100 includes resiliently flexible retainer elements in the form of two helically coiled spring wire retainers 102 including spring wire retainer portions in the form of helically coiled springs 104 extending in chordal directions across the opening 50 parallel to one another to establish a generally rectangular aperture 106. Each of the spring wire retainers 102 is affixed to the reflector 32 so as to place the springs 104 and aperture 106 in appropriate juxtaposition with the opening 50 in the reflector 32. The relationship between the configuration and dimensions of the aperture 106 and the lamp base 42 is such that the parallel pattern of springs 104 enables safety retainer 100 to operate in a manner similar to that described in connection with safety retainer 70.

It will be seen that the present invention provides a safety retainer arrangement for preventing the fall of an inadvertently uncoupled compact fluorescent lamp from a luminaire and, as such, attains the several objects and advantages summarized above; namely: Provides a simple arrangement easily incorporated into current luminaire constructions for effectively precluding the fall of a compact fluorescent lamp from the luminaire upon inadvertent uncoupling of the lamp from the lamp socket of the luminaire; catches a dropped inadvertently uncoupled lamp so as to prevent destruction of the lamp, as well as damage to adjacent equipment and injury to persons beneath the luminaire, in the path of the falling uncoupled lamp, without impeding selective removal and replacement of the lamp; is readily employed in connection with a wide variety of luminaire constructions without requiring extensive modification of existing luminaire designs; introduces no adverse effects in the lighting performance of the luminaire into which the arrangement is incorporated; is relatively inexpensive and easily adapted to current luminaire constructions for immediate and widespread use.

It is to be understood that the above detailed description of preferred embodiments of the invention is provided by way of example only. Various details of design and construction may be modified without departing from the true spirit and scope of the invention as set forth in the accompanying claims.

The embodiments of the invention in which an exclusive property or privilege is claimed are defined as follows:

1. A safety retainer for a luminaire of the type including a lamp socket and a compact fluorescent lamp having a lamp base normally received within the lamp socket and a lamp envelope extending longitudinally downwardly from a near end at the lamp base to a far end away from the lamp base, the lamp base having an outer periphery including at least portions extending laterally outwardly beyond the lamp envelope adjacent the near end of the lamp envelope, the safety retainer comprising:

resiliently flexible retainer elements affixed to the luminaire and having spring wire retainer portions at retainer locations placed laterally inwardly beneath the lamp socket to establish an aperture through which the lamp envelope projects when the lamp is in the luminaire, at least portions of the aperture at the retainer locations being laterally smaller than corresponding portions of the outer periphery of the lamp base and placed beneath the corresponding portions of the outer periphery of the lamp base when the lamp is received within the lamp socket for interception of the lamp base by the retainer elements should the lamp base fall from the lamp socket;

the resilient flexibility of the spring wire retainer elements being such that the lamp will be supported by the retainer elements against falling downwardly through the safety retainer, and will enable deliberate resilient dilation of the aperture at the retainer locations to permit selective movement of the lamp base through the safety retainer for removal and replacement of the lamp in the luminaire.

2. The invention of claim 1 wherein the luminaire includes a reflector affixed to the luminaire and having an opening, the lamp socket is located above the opening and the lamp envelope projects downwardly through the opening when the lamp base is received in the lamp socket, and the safety retainer is affixed to the reflector so that at least the spring wire retainer portions extend into the opening.

3. The invention of claim 1 wherein the spring wire retainer portions of the retainer elements extend in chordal directions across the opening.

4. The invention of claim 3 wherein the spring wire retainer portions of the retainer elements are placed in a rectangular pattern around the aperture.

5. The invention of claim 3 wherein the spring wire retainer portions of the retainer elements are placed in a triangular pattern around the aperture.

6. The invention of claim 1 wherein at least the spring wire retainer portions of the retainer elements include a cover of nonmetallic material.

7. The invention of claim wherein the aperture is essentially complementary to corresponding portions of the lamp envelope.

8. The invention of claim 6 wherein the cover comprises a tubular sheath of heat-resistant textile material.

9. The invention of claim 1 wherein the spring wire retainer portions comprise helically coiled springs.

10. The invention of claim 9 wherein the luminaire includes a reflector affixed to the luminaire and having an opening, the lamp socket is located above the opening and the lamp envelope projects downwardly through the opening when the lamp base is received in the lamp socket, and the safety retainer is affixed to the reflector so that the spring wire retainer portions of the retainer elements extend into the opening.

11. The invention of claim 10 wherein the spring wire retainer portions of the retainer elements extend in chordal directions across the opening..

12. The invention of claim 11 wherein the spring wire retainer portions of the retainer elements are placed in a rectangular pattern around the aperture.

13. The invention of claim wherein the spring wire retainer portions of the retainer elements are placed in a triangular pattern around the aperture.

14. The invention of claim 10 wherein at least the spring wire retainer portions of the retainer elements include a cover of non-metallic material.

15. The invention of claim 14 wherein the aperture is essentially complementary to corresponding portions of the lamp envelope.

16. The invention of claim 14 wherein the cover comprises a tubular sheath of heat-resistant textile material.

* * * * *